Jan. 16, 1962   B. J. SIMMONS   3,017,252
COMPOSITION ANALYZER UTILIZING RADIATION
Original Filed Oct. 8, 1953   3 Sheets-Sheet 1
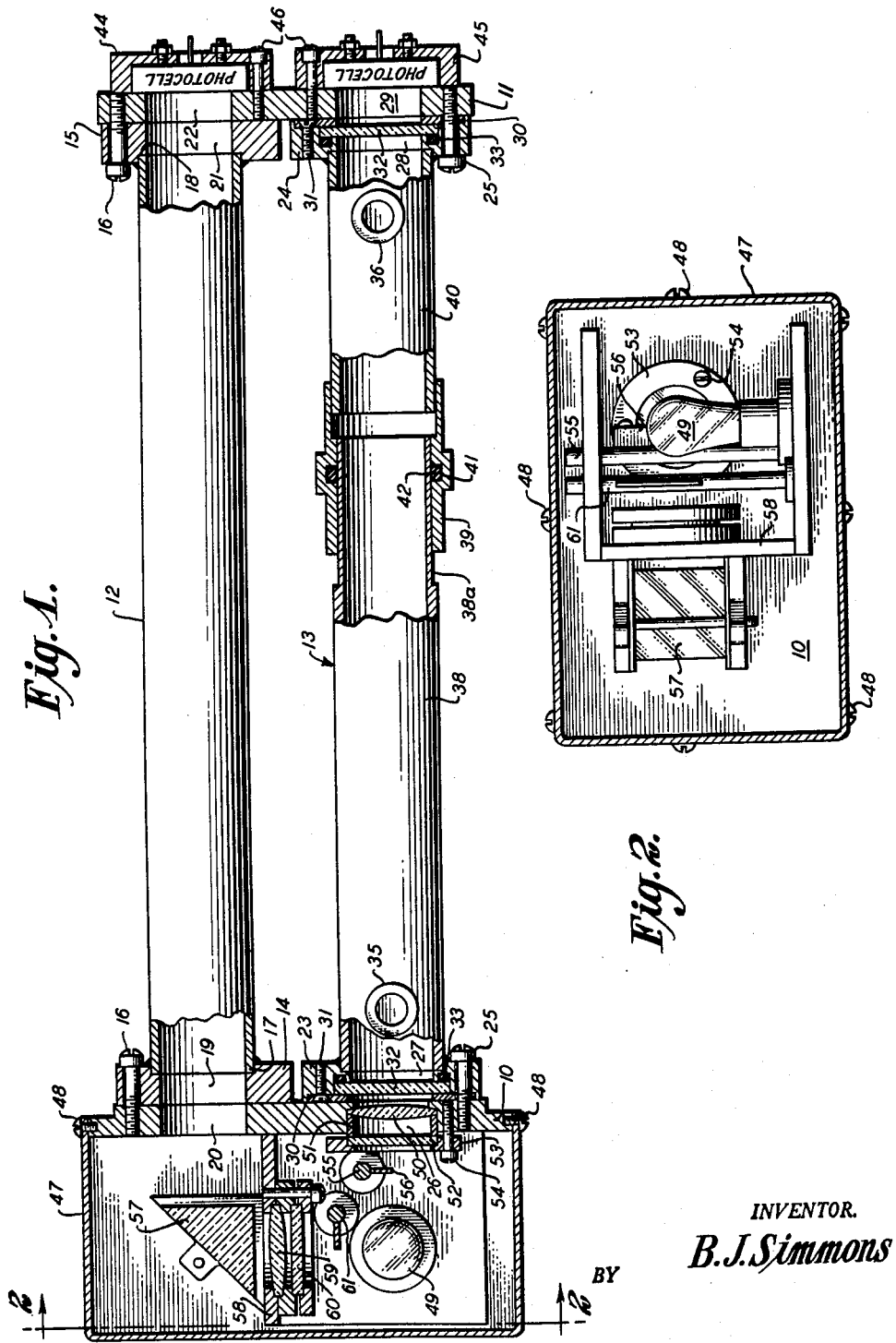
INVENTOR.
B. J. Simmons
BY
ATTORNEYS INVENTOR.
B. J. Simmons
BY
ATTORNEYS

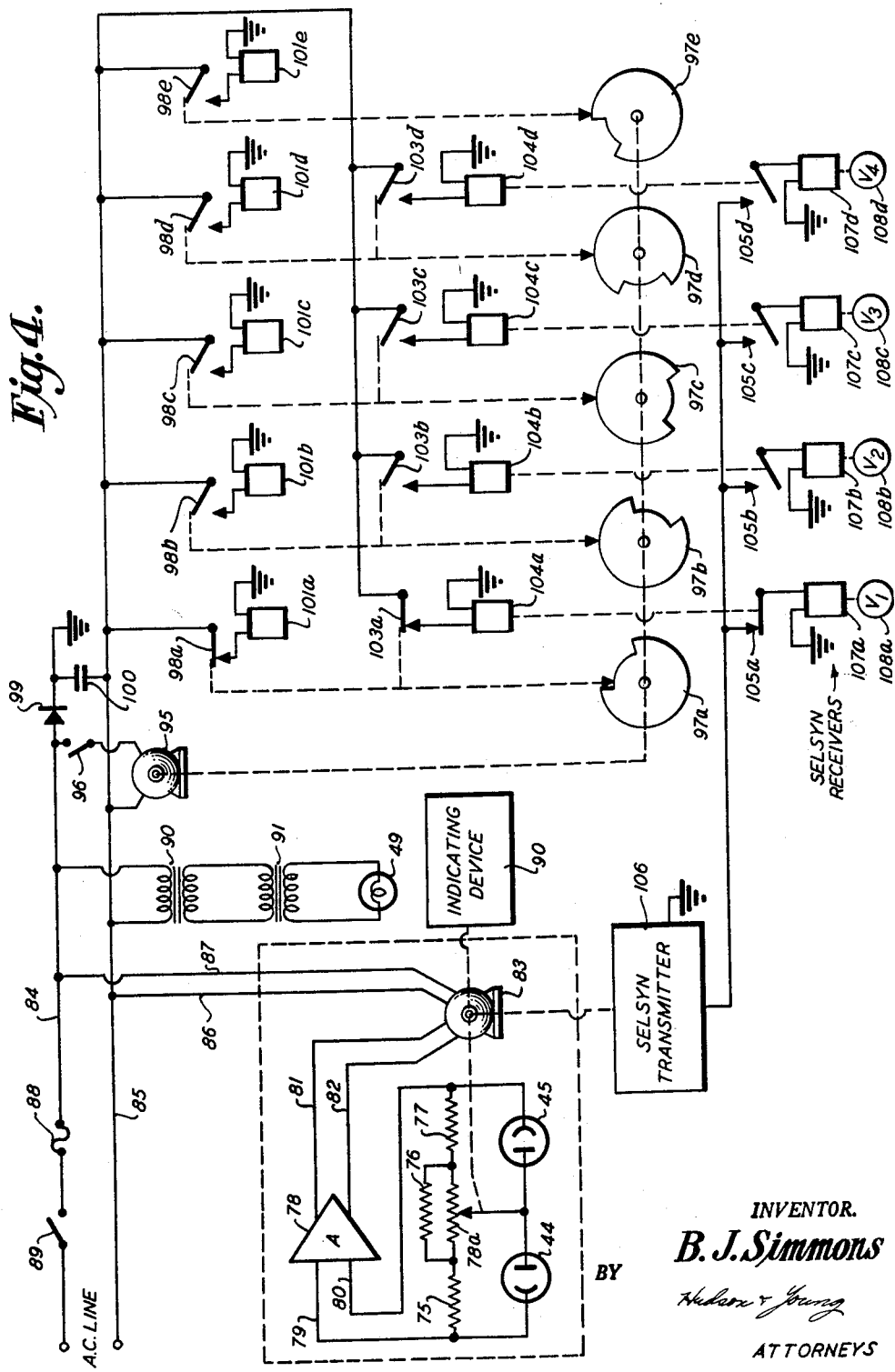

United States Patent Office 3,017,252
Patented Jan. 16, 1962

3,017,252
COMPOSITION ANALYZER UTILIZING RADIATION
Bill J. Simmons, Downey, Calif., assignor to Phillips Petroleum Company, a corporation of Delaware
Original application Oct. 8, 1953, Ser. No. 384,815, now Patent No. 2,854,585, dated Sept. 30, 1958. Divided and this application Apr. 21, 1958, Ser. No. 732,111
2 Claims. (Cl. 23—260)

This application is a division of copending application Serial No. 384,815, filed October 8, 1953, now Patent No. 2,854,585.

This invention relates to an analyzer for determining the composition of a stream by passing a beam of radiation therethrough and measuring the amount of radiation absorbed. In another aspect, it relates to the successive indication of nitrogen dioxide content in the effluent streams from a plurality of converters in a nitric acid plant. In still another aspect, it relates to the control of such plant by the use of an analyzer of the character set forth.

According to this invention, an analyzer of very simple design is provided whereby a radiation beam can be passed through a radiation sample cell and also through a standard cell onto a pair of radiation-sensitive devices, the indications produced by such devices being representative of the concentration of a selected component in the sample stream. The apparatus herein disclosed is particularly suitable for determination of the nitrogen dioxide concentration in a process stream, such as the effluent gas produced in a converter wherein water and nitrogen dioxide are reacted to form nitric acid. The analyzer of this invention can advantageously be utilized in such a nitric acid plant wherein a plurality of converters are incorporated, either to successively indicate the nitrogen dioxide concentration in the converters or to simultaneously indicate such concentration and control the reaction by regulation of the water or nitrogen dioxide fed to the respective converters. It is a feature of the invention that standardization of the instrument is provided for, i.e., provision is made for periodically recalibrating the instrument to compensate for errors caused by aging of circuit components, drift, or changes in characteristics of the optical system.

Accordingly, it is an object of this invention to provide an analyzer of novel and improved construction.

It is a further object to provide an analyzer capable of successively indicating the nitrogen dioxide concentration in a plurality of streams containing this material.

It is a further object to provide an automatic control system for a nitric acid plant based upon analysis of effluent streams from a plurality of converter units.

It is a further object to provide apparatus of the character described which is reliable in operation, economical to manufacture, and utilizes a minimum number of components.

Various other objects, advantages, and features of the invention will become apparent from the following detailed description taken in conjunction with the accompanying drawings, in which:

FIGURE 1 is a top view, partially in section, of an analyzer constructed in accordance with the invention;

FIGURE 2 is a sectional view taken along the line 2—2 of FIGURE 1, looking in the direction of the arrows;

FIGURE 4 is a schematic circuit diagram of the operating circuit.

Figure 3:
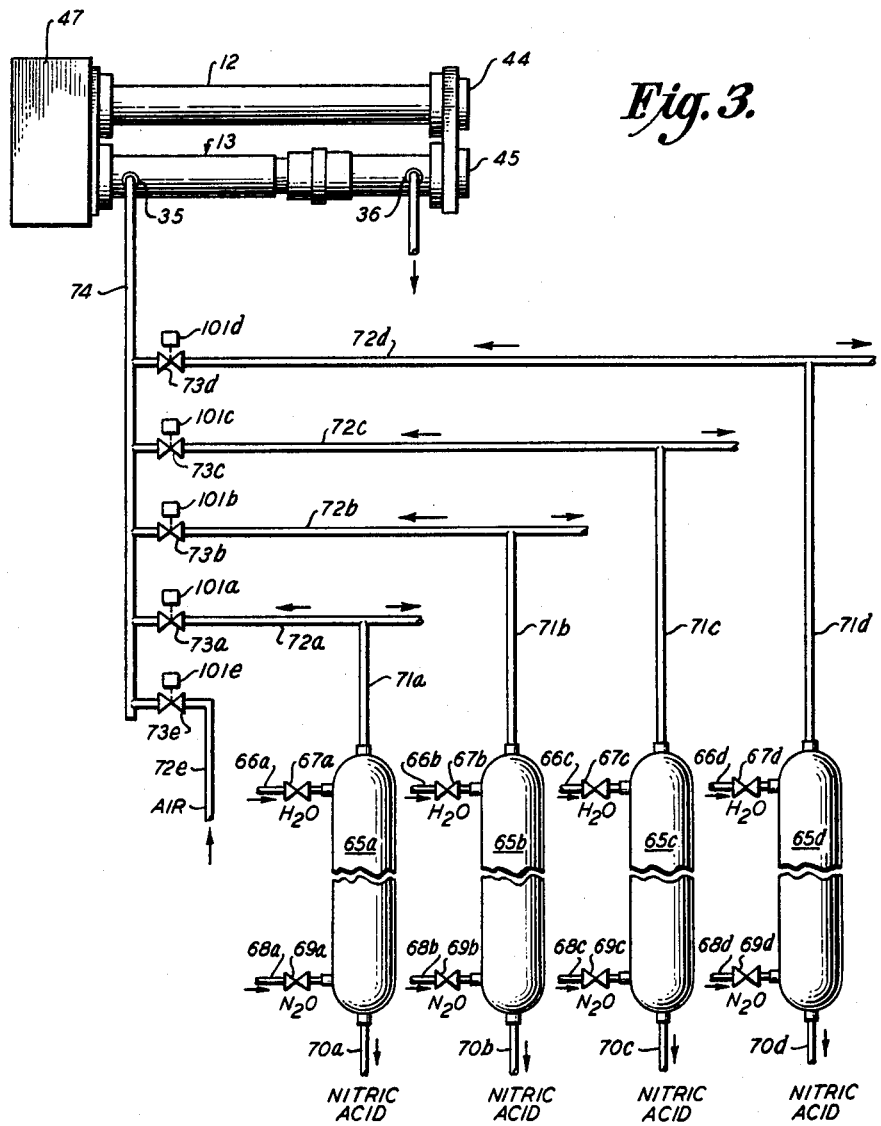
FIGURE 3 is a schematic representation of a nitric acid plant incorporating the indicating and/or control system of this invention.

Referring now to the drawings in detail and particularly to FIGURES 1 and 2, the improved analyzer structure includes a pair of spaced plates 10 and 11. A pair of elongated, parallel, spaced metal tubes 12 and 13 are mounted between and secured to the plates 10 and 11. To this end, tube 12 is welded to a pair of base members 14 and 15 which, in turn, are suitably secured, as by bolts 16, to the respective plates 10 and 11, it being noted that the ends of tube 12 fit into recessed portions 17 and 18 of the respective base members 14 and 15. As a result, tube 12 and plates 10, 11 form a rigid assembly. Plate 10 and base member 14 have aligned openings 19 and 20 formed therein of the same size as and in axial alignment with the interior opening of tube 12, and similar openings 21, 22 are formed in base member 15 and plate 11, respectively.

Tube 13 is secured to the plates 10 and 11 in a generally similar manner, the ends of this tube fitting within recesses formed in a pair of base members 23 and 24 which are secured to the respective plates 10 and 11, as by bolts 25. Openings 26, 27 are formed in plate 10 and base member 23, respectively, extending completely through these members and axial-alignment with the interior of tube 13. In similar fashion, openings 28 and 29 are formed in base member 24 and plate 11, respectively.

Each of the base members 23, 24 has a recessed portion formed at the end thereof remote from tube 13, and a washer 30 is secured within each such recessed portion by bolts, one of which is indicated by reference numeral 31. Each washer 30 protrudes into the associated opening in base member 23 or 24 and fits against one surface of a transparent window or disk 32, the other end of which bears against an annular sealing gasket 33 fitted in a suitable recess formed in the base member 23 or 24. This structure provides a gas-tight seal at each end of tube 13 while the transparency of the disk or window 32 permits the passage of radiation therethrough.

Communicating with the interior of tube 13 is a sample inlet 35 and a sample outlet 36 so that the material to be analyzed can be readily inserted into and removed from the tube 13.

It is a feature of the invention that tube 13 is formed from two telescopically-mounted sections 38 and 39, section 39 being welded or otherwise suitably secured to a tube section 40 so as to form an integral part thereof. The inner surface of tube 39 slides upon a reduced end portion 38a of section 38, and member 39 is shaped to form an annular interior recess 41 within which is mounted an annular gasket 42. This gasket bears against the outer surface of reduced portion 38a. It will be evident that the described structure provides a gas-tight sliding connection between the two telescoping tube sections 38 and 39, 40. Thus, in assembling the apparatus, plates 10 and 11 can be adjusted to form a rigid connection with tube 12 thereby providing, for all practical purposes, an integral assembly, the sliding movement permitted by the described telescopic connection permitting expansion or connection of tube 13 to the extent required to provide the desired mechanical rigidity. Further, such sliding connection is effected without affecting the seal of tube 13 or permitting leakage of gas therefrom, even though the gas may be at a substantial pressure.

The optical system associated with the tubes 12 and 13 includes a pair of radiation detectors 44 and 45. Preferably and advantageously, these detectors are photoelectric cells and they are arranged for mounting upon plate 11, as by bolts 46, so as to overlie and cover the respective passages 21, 22 and 28, 29. At the opposite end of the tubes, a housing 47 is secured to plate 10, as by bolts 48, so that the interior of tube 12 and housing 47 defines a gas-tight chamber filled with air. In certain cases, governmental regulations require that the chamber not be gas-tight.

Mounted in the housing 47 is a radiation source, preferably an incandescent bulb or other source of visible radiation. This source is denoted by reference numeral 49 and it is in alignment with the axis of tube 13. Accordingly, source 49 produces a beam of radiation which passes directly through tube 13 and impinges upon photoelectric cell 45. A lens 50 is secured within a suitable recess in plate 10 by a sleeve 51, and a filter disk 52 abuts sleeve 51, the assembly of lens 50, sleeve 51, and filter 52 being held in assembled position by an end cap 53 secured to plate 10 by bolts, one of which is indicated at 54. A rotatable trimmer 55 is positioned within the path of the aforementioned beam, and this trimmer includes a movable plate 56 which can be swung into and out of the path of the beam so as to vary its intensity. Lens 50 is provided to focus the radiation beam upon photoelectric cell 45, and filter 52, in the case of a nitrogen dioxide analyzer, is preferably a disk of colored glass incorporating suitable pigment material so as to provide a transmission band for light having a wave length between 3400 and 5900 angstrom units.

Also mounted in the housing 47 is a prism 57, one end of which abuts an assembly 58 supporting a lens 59 and a filter 60 having similar optical characteristics to filter 52. A trimmer 61, similar to trimmer 55, is mounted between the source 49 and the filter 60. It will be evident that a second beam of light passes from source 49 through filter 60 and lens 59 to prism 57 whence it is reflected and passes axially along tube 12 to photoelectric cell 44.

In the operation of the analyzer, a sample to be analyzed passes, preferably continuously, through the inlet 35 into tube 13 and, thence, through outlet 36. Changes in the radiation absorption of the sample produce an effect upon detector 45 but not upon detector 44, the filters 52 and 60 being properly chosen to sensitize the beam incident upon detector 45 to the compound or component of interest. Accordingly, the differential output of detectors 44 and 45 is representative of the concentration of such selected component or compound in the test sample. Due to the provision of tube 12, changes in intensity resulting from variations in the source voltage affect both detectors equally and, hence, are not reflected in the differential reading.

Where the analyzer is utilized to determine the concentration of nitrogen dioxide, as stated, source 59 is a source of visible light, the detectors 44, 45 are photoelectric cells, and the filters 52, 60 have a transmission band for wave lengths of 3400 to 5900 angstrom units. Nitrogen dioxide, being bluish-green in color, has a strong absorption band within the aforesaid wave length range. Consequently, the analyzer is extremely sensitive to variations in color induced by changes in concentration of the nitrogen dioxide, and is substantially or wholly unaffected by absorption of wave lengths outside the aforementioned range by the test component. Therefore, the differential reading of photoelectric cells 44, 45 is representative of the nitrogen dioxide content of the test sample.

Preferably and advantageously, at intervals, air is passed through tube 13 and trimmers 55, 61 are adjusted to provide a predetermined differential between the outputs of photoelectric cells 44 and 45. In this manner, disturbances created by aging of circuit components, variations in line voltage, drift, and the like, are compensated for, this recalibration operation being referred to herein as standardization of the instrument.

In FIGURE 3, I have shown the application of the described analyzer to analysis and/or control of a nitric acid plant embodying four or any other suitable number of converters 65a to 65d. In these converters, water is introduced through the respective lines 66a to 66d under the control of valves 67a to 67d. This water falls through the converter vessel as a spray and contacts vapors of nitrogen dioxide introduced through lines 68a to 68d under the control of valves 69a to 69d. Nitric acid is withdrawn from the bottom of the converters through lines 70a to 70d while unabsorbed nitrogen dioxide passes overhead through effluent conduits 71a to 71d. Optimum operation of the system is obtained by maintaining a predetermined concentration of nitrogen dioxide in each of the effluent conduits. To this end, material from the effluent conduits can pass through sample lines 72a to 72d and valves 73a to 73d to a common sample line 74 which communicates with the inlet 35 of the analyzer described in connection with FIGURES 1 and 2. A sample line 72e communicating with the atmosphere also communicates through a valve 73e with the common sample line 74 for the purpose of admitting air under pressure to the tube 13 for standardization purposes.

In accordance with the invention, effluent from the sample lines is passed, each for a timed period, into the analyzer and then a cycle is completed by injecting air into the analyzer for standardization purposes. Thus, the effluent of each converter is analyzed for a timed period during each cycle of operation. Also, control of the converter operations can take place in conjunction with the indication of the nitrogen dioxide contents of the respective converter effluents. Such control can be effected either by automatically adjusting the set 67 of control valves regulating the amount of water fed to the converters or, alternatively, the control can be effected by varying the setting of the set 69 of control valves regulating the amount of nitrogen dioxide fed to the converters. The mechanism for effecting such analysis and/or control is illustrated in FIGURE 4.

Referring now to FIGURE 4, it will be noted that the photoelectric cells 44 and 45 are connected in a bridge circuit with balancing impedances 75, 76, and 77, impedance 76 having a potentiometer 78a connected in parallel therewith. The voltage appearing across two opposite corners of the bridge is fed to the input circuit of an analyzer 78 by leads 79 and 80. If the photoelectric cells are of the self-generating type, as shown, it is not necessary to provide a current source in the bridge circuit. If the photoelectric cells are not of the self-generating type, an operating potential is supplied to them in any suitable manner. The output of amplifier 78 is fed by leads 81 and 82 to a balancing motor 83 having field windings connected to alternating current lines 84, 85 by leads 86 and 87. The alternating current line can include the usual fuse 88 and switch 89.

The rotor of motor 83 is mechanically connected to the contactor of potentiometer 78a and to an indicating device 90. The connection of motor 83 to the bridge potentiometer is such that the bridge is driven to a balanced position by operation of the motor. Accordingly, the shaft position of motor 83, the position of the potentiometer contactor, and indicating device 90 all indicate the differential voltage generated by the photoelectric cells. With cell 13 filled with nitrogen dioxide, and cell 12 filled with air, this differential reading is representative of the nitrogen dioxide content of the sample fed through inlet 35, FIGURES 1 and 3.

Conveniently, the energizing current for source 49 can be supplied from line 84, 85 by suitable transformers 90 and 91.

Also energized by line 84, 85 is a timer motor 95 actuatable by a switch 96. The shaft of motor 95 is mechanically connected to a series of cams 97a to 97e which, as the motor rotates, successively operate a series of cam-actuated contacts 98a to 98e. One contact of each set 98 receives filtered rectified voltage from line 84, 85 by virtue of a rectifier 99 and a condenser 100. The other contacts of the set 98 are connected, respectively, to ground through solenoid windings 101a to 101e operatively associated with the respective valves 73a to 73e, FIGURE 3. Consequently, as motor 95 rotates its shaft through a full revolution, a cycle of operation occurs in which each of the valves 73a to 73e is successively opened for a timed period determined by the length of the grooves in the cams 97a to 97e. As a result, the nitrogen dioxide content of the gases in effluent lines 71a to 71d is successively analyzed, and then air is passed through the cell 13 for standardization purposes. It will be recalled that such standardization is effected by adjustment of trimmers 55 and 61, FIGURE 1.

Where the process of the plant is controlled by the analyzer, additional sets of contacts 103a to 103d are associated with the respective cams 97a to 97d. One contact of each set 103 is connected to supply line 85 and the other contact is connected to ground through an associated relay winding 104a to 104d. When energized, each relay winding 104 closes the associated one of four sets 105a to 105d of contacts. Each set 105 of contacts, when closed, electrically connects a selsyn transmitter 106, which is mechanically connected to the shaft of motor 83, to one of a set of selsyn receivers 107a to 107d. These selsyn receivers, in turn, drive, respectively, a set of valves $V_1$ to $V_4$. These latter valves can be either set 67 of water control valves 61 of FIGURE 3 or the set 69 of nitrogen dioxide control valves.

From the foregoing description, it will be evident that, when the effluent from converter 65a passes through the analyzer, selsyn transmitter 106 is connected through contacts 105a to selsyn receiver 107a which operates either the water control valve or nitrogen dioxide control valve of converter 65a. This valve automatically adjusts, therefore, the amount of water or nitrogen dioxide fed to the converter so as to maintain a constant concentration of nitrogen dioxide in the converter effluent. Such control action proceeds for a timed period whereupon the contacts associated with cam 97a are opened and the contacts associated with cam 97b are closed. Thereupon the nitrogen dioxide content of converter 71b is analyzed and the operation of this converter is controlled in the manner just described. Thereafter, the cycle continues in the same manner with respect to the converter 65c, 65d, after which valve 73a is opened for a timed period to admit air to tube 13 for standardization purposes. It is usually desirable to have relays 104 be of the slow acting type so that the control action is not initiated until the gases from the preceding converter are swept from the sample cell and replaced by the sample under test. Other methods of affecting such a time delay will be readily apparent to those skilled in the art.

It will be evident that I have obtained the objects of my invention in providing a simple, rugged, and reliable analyzer capable of general application but being particularly adapted for the analysis of nitrogen dioxide-containing gaseous streams by reason of the features of construction, and optical arrangement of the analyzer unit. Further, I have provided a system whereby the output of a number of nitric acid converters can be controlled by a single analyzer, or, alternatively, this single instrument can be used to indicate the converter nitrogen dioxide content successively of a plurality of converters. Finally, provision is made for standardization of the instrument to compensate for errors resulting from aging of circuit components, drift, changes in line voltage and the like.

While the invention has been described in connection with a present, preferred embodiment thereof, it is to be understood that this description is illustrative only and is not intended to limit the invention.

I claim:

1. In a nitric acid production system wherein nitrogen dioxide is passed through a plurality of first conduits to a plurality of respective reactors, water is passed through a plurality of second conduits to said reactors, nitric acid formed in said reactors is removed through respective product conduits, and off-gas from said reactors is removed through respective effluent conduits which communicate with the tops of said reactors, respectively; a control system comprising a pair of photoelectric cells, a source of visible light, means for passing beams of light from said source to said photoelectric cells, a chamber in the path of one of said beams, a plurality of valved sample lines connected between respective ones of said effluent conduits and said chamber, a timer, means responsive to said timer to open the valves in said sample lines in succession, a bridge network including said photocells to provide an output signal representative of the difference between the amounts of light on said photocells, said output signal being representative of the concentration of nitrogen dioxide in said effluent conduit, a control valve in each of said first conduits, a selsyn receiver connected to each of said control valves, a selsyn transmitter actuated by said output signal, and means responsive to said timer to connect said transmitter to said receivers in succession so that a control valve is regulated which is associated with the same reactor from which a sample of the effluent is being analyzed so as to decrease the flow of nitrogen dioxide when said output signal exceeds a preselected value and to increase the flow of nitrogen dioxide when said output signal becomes less than said preselected value, thereby maintaining said output signal at said preselected value.

2. In a nitric acid production system wherein nitrogen dioxide is passed through a plurality of first conduits to a plurality of respective reactors, water is passed through a plurality of second conduits to said reactors, nitric acid formed in said reactors is removed through respective product conduits, and off-gas from said reactors is removed through respective effluent conduits which communicate with the tops of said reactors, respectively; a control system comprising a pair of photoelectric cells, a source of visible light, means for passing beams of light from said source to said photoelectric cells, a chamber in the path of one of said beams, a plurality of valved sample lines connected between respective ones of said effluent conduits and said chamber, a timer, means responsive to said timer to open the valves in said sample lines in succession, a bridge network including said photocells to provide an output signal representative of the difference between the amounts of light on said photocells, said output signal being representative of the concentration of nitrogen dioxide in said effluent conduit, a control valve in each of said second conduits, a selsyn receiver connected to each of said control valves, a selsyn transmitter actuated by said output signal, and means responsive to said timer to connect said transmitter to said receivers in succession so that a control valve is regulated which is associated with the same reactor from which a sample of the effluent is being analyzed so as to increase the flow of water when said output signal exceeds a preselected value and to decrease the flow of water when said output signal becomes less than said preselected value, thereby maintaining said output signal at said preselected value.

References Cited in the file of this patent

UNITED STATES PATENTS

| | | |
|---|---|---|
| 2,302,061 | Schirm | Nov. 17, 1942 |
| 2,395,489 | Major et al. | Feb. 26, 1946 |
| 2,417,321 | Park et al. | Mar. 11, 1947 |
| 2,667,410 | Pierce | Jan. 26, 1954 |
| 2,697,652 | Ribble et al. | Dec. 21, 1954 |